(12) United States Patent
Reinsch

(10) Patent No.: US 6,460,920 B1
(45) Date of Patent: Oct. 8, 2002

(54) MOTOR VEHICLE CONVERTIBLE ROOF STRUCTURE

(75) Inventor: Burkhard Reinsch, Kaufbeuren (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/641,766

(22) Filed: Aug. 21, 2000

(30) Foreign Application Priority Data

Aug. 21, 1999 (DE) .......................... 199 39 725

(51) Int. Cl.⁷ .......................... B60J 7/043; B62D 25/06
(52) U.S. Cl. .................. 296/216.08; 296/210; 296/205; 296/203.03
(58) Field of Search ................... 296/210, 205, 296/216.07–216.08, 219, 203.03, 135, 146.9

(56) References Cited

U.S. PATENT DOCUMENTS 2,210,590 A * 8/1940 Jobst ..................... 296/107.17
5,269,585 A * 12/1993 Klages et al. ................ 296/205
5,934,745 A * 8/1999 Moore et al. ........... 296/901 X

FOREIGN PATENT DOCUMENTS

| DE | 44 44 539 C2 | | 9/1997 | |
| DE | 197 02 336 A1 | | 7/1998 | |
| EP | 146716 | * | 7/1985 | ................. 296/205 |
| FR | 2577490 | * | 8/1986 | ................. 296/210 |
| FR | 2594780 | * | 8/1987 | ................. 296/210 |
| JP | 53115 | * | 3/1988 | ................. 296/219 |
| JP | 57329 | * | 3/1988 | ................. 296/219 |
| JP | 403067723 | * | 3/1991 | ............ 296/216.08 |

* cited by examiner

Primary Examiner—Dennis H. Pedder
(74) Attorney, Agent, or Firm—Nixon Peabody LLP; David S. Safran

(57) ABSTRACT

The invention relates to a motor vehicle convertible roof structure with a folding roof which is movably guided in guide rails (23) in the area of the side members (11) on each side of the vehicle roof. The side members (11) have an extruded section (12) which bears the respective guide rail (23) on its inner side, an outer skin panel section (13) on its outer side and a door and/or window pane seal (14) on its bottom.

12 Claims, 2 Drawing Sheets

MOTOR VEHICLE CONVERTIBLE ROOF STRUCTURE

BACKGROUND OF THE INVENTION

1. Field of the Invention

This invention relates to a motor vehicle convertible roof structure with a folding roof which is movably guided in guide rails in the area of the vehicle roof side members on each side of the vehicle roof.

2. Description of Related Art

Building side members and guide rails of a vehicle convertible roof structure of the type to which the present invention is directed in a sheet metal shell design is known. Based on the shape of the sheet metal shells and due to the compression direction, tool costs are high. Furthermore, executing the side members and guide rails by means of extruded sections which run parallel with outside visible surfaces or an outer skin is known, the guide functions for the folding roof being integrated into this structure. The outside configuration of the side members is thus dictated by the profile and bending contour and the optics are bound to the desired function. To achieve an optically perfect surface, accuracy of shape, and small guide tolerances, in this approach, an expensive and complex bending process is necessary.

SUMMARY OF THE INVENTION

In view of this prior art, the primary object of the present invention is to devise a vehicle convertible roof structure which, in the area of the side members and guide rails, can be economically produced and installed, and in addition, ensures the required high quality optics with respect to the outer skin and is suitable for detachable mounting.

This object is achieved by the side members having an extruded section on an inner side of which the respective guide rail is provided, on an outer side of which an outer skin panel section is provided and on a bottom side of which a door and/or window pane seal is provided.

In other words, the side member/guide rail structure of the vehicle convertible roof structure is based on an extruded section for the side member which accommodates the guide rail at its inner side, supports the outer skin panel section at its outer side, and on the bottom has a door and/or window pane seal. Accordingly, the side member is based on a single extruded section which is bent to follow the contour of the top edge of the door pane or the window pane after the extrusion process. This bending process represents a simple forming measure and can be carried out precisely.

Furthermore, it is advantageously provided that the extruded section has a support crosspiece which at least roughly follows the shape of the outer skin panel section and to which the outer skin panel section is spot joined. This measure of spot connection of the outer skin panel section to the extruded section, in contrast to the prior art which requires precise prefabrication, has the advantage that the outer skin panel section can be joined to the extruded section of the side member to balance tolerances. There is preferably either an elastic adhesive connection or an elastic clip connection which allows different thermal expansion between the material of the outer skin panel section and the material of the extruded section. Instead of a spot connection of these parts an elastic connection by means of, for example, adhesive beads is possible.

For simple installation capacity, the door and/or the window pane seal is slipped onto a shell-type crosspiece which projects from the bottom of the extruded section.

Since the extruded section typically has a curved shape, while the guide rail is naturally made elongated for the folding roof, these two components of the vehicle convertible roof structure under consideration are made separately from one another and are preferably screwed to one another. To be able to ensure the required precise alignment of the guide rail with reference to the extruded section using simple means, it is advantageously provided that the inner side of the extruded section has at least two bearing ribs for the guide rail which extend in the lengthwise direction and which are spaced transversely to it and at least one groove essentially parallel thereto for engagement of self-tapping screws which penetrate holes or slots in the guide rail or in a flange or crosspiece located on it.

The extruded section with its bonding sites for the guide rail and the outer skin panel section and the shell-type crosspiece for the door and/or window pane seal, preferably, comprises a core which is essentially triangular in cross section with an outer side which forms the support rest of the outer skin panel section, an inner side for binding of the guide rails, for example, by screwing, and the shell-type flange which projects downward to the outside for the door and/or window pane seal. Within the framework of this triangular core, on the inner crosspiece thereof, the inwardly projecting bearing ribs for the guide rail are preferably formed, while there is groove for engaging the self-tapping screws for fixing the guide rail on the extruded section in an inner corner area of the triangular core of the extruded section.

To ensure the necessary tightness on the bottom edge of the outer skin panel section, the door and/or window pane seal is advantageously provided, in addition, with a sealing section for sealing relative to the lower edge of the outer skin panel section.

In order to ensure the necessary tightness on the top of the convertible roof structure in the area of the side members, it is advantageously provided that the guide rail, on its top, bears a seal for sealing relative to the closed folding roof and the top edge of the outer skin panel section. This seal, like the door and/or window pane seal, can be placed on a shell-type crosspiece of the guide rail or into the slot of a retaining rail section.

The extruded section of the side members preferably are made of aluminum or plastic.

The side members of the vehicle convertible roof structure in accordance with the invention are also suitable, due to their compact and functional structure, for detachable connection to the vehicle body. In this case, the side members are sealed also on their two ends relative to the vehicle body and preferably bear these seals there themselves.

According to one especially advantageous development of the invention, the detachable side members are formed with a peripheral seal structure which integrally comprises both the seal on the ends of the side members and on the bottom of the extruded section and on the top of the guide rail. This measure facilitates installation of the sealing means and increases the sealing properties based on the integral execution of the individual functional sealing parts.

The invention is explained in detail below using the single figure.

DETAILED DESCRIPTION OF THE INVENTION

Figure 1:
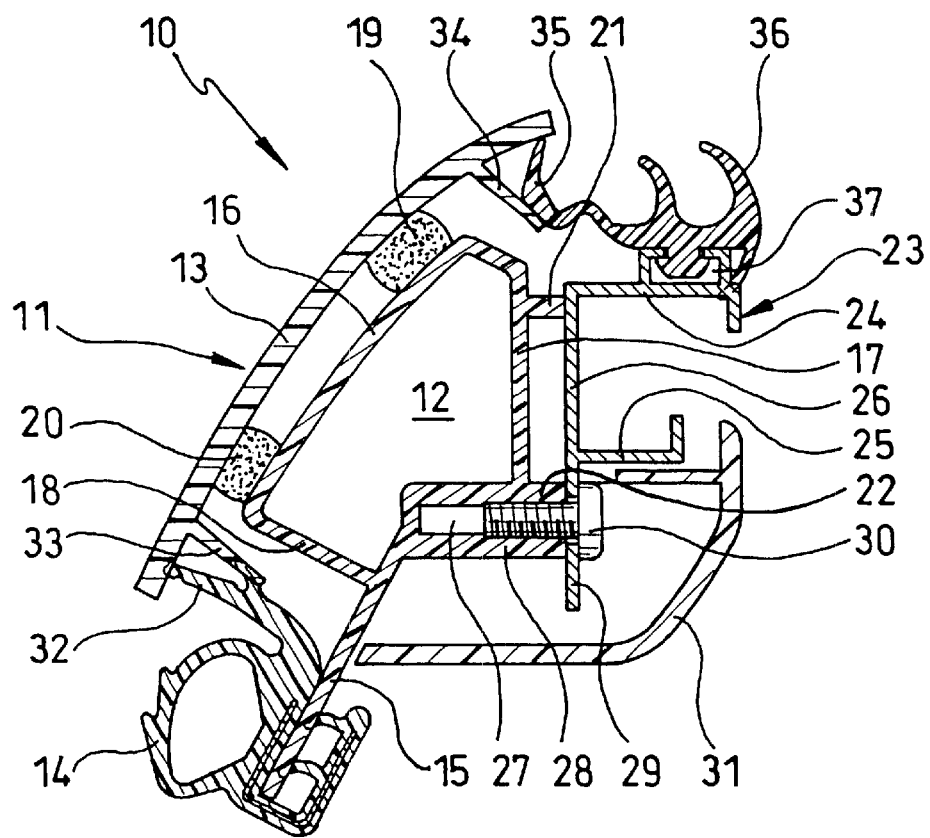
FIG. 1 is a cross-sectional view of an embodiment of the structure formed of the side member and the guide rail of the vehicle convertible roof of the present invention in which an extruded section is made of plastic.
Figure 2:
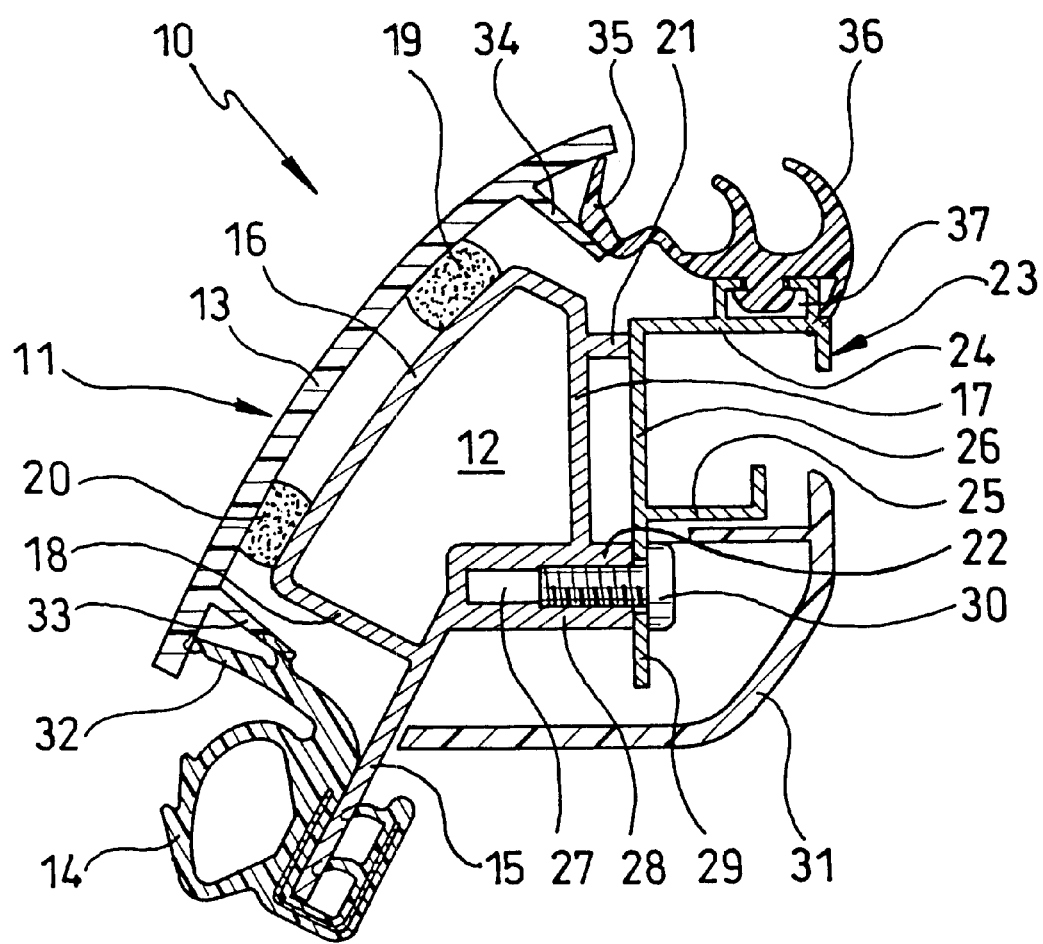
FIG. 2 is a view corresponding to that of FIG. 1 in which the extruded section is made of aluminum.

In the figures, the roof guide rail structure comprised of a side member 11 and a guide rail 23, as a whole, is indicated by reference numeral 10. This roof guide rail structure 10 forms one component of a vehicle convertible roof structure with a folding roof and is located on each side of the folding roof, bordering and guiding it. An example of such a vehicle convertible roof and guide rail structure in which the present invention can be incorporated (in place of the roof guide rail structure shown therein) can be found, for example, in co-pending, commonly owned, now U.S. patent application Nos. 09/594,342 and 09/593,437 pending which are hereby incorporated by reference to the extent necessary to complete an understanding of this application.

The side member 11 of the guide rail structure 10 comprises a plastic or aluminum extruded section 12, which is curved in the lengthwise direction of the vehicle convertible roof structure 10 and has a generally triangular cross section, and at its outer side, an outer skin panel section 13 which is preferably produced from plastic, which is likewise curved in the lengthwise direction and is also curved transversely to its longitudinal direction. In addition, the side member 11 comprises a carrier 15 for a door and/or a window pane seal 14 which forms one component of the extruded section 12 and which has the shape of a shell-type crosspiece which projects sloping downwardly and outwardly from the bottom of the extruded section 12.

The extruded section 12 comprises an outside support crosspiece 16, an inside bearing crosspiece 17 which runs essentially perpendicularly to the lengthwise extension of the side member 11 and a connecting crosspiece 18 which lies underneath and which joins the support crosspiece 16 to the bearing crosspiece 17.

The support crosspice 16 has a contour which at least roughly follows the contour of the outer skin panel section 13 which is located at a distance to the support crosspice 16 and is spot joined to it by elastic means, for example, by adhesive beads which are spaced apart, and of which two adhesive beads 19 and 20 are shown in the figures and which are located in the top and bottom corner area of the extruded section 12.

The bearing crosspiece 17 comprises inwardly projecting bearing ribs 21, 22 which are provided on the top and bottom end of the bearing crosspiece 17 and are used as bearing means for the generally U-shaped guide rail 23. The guide rail 23 accordingly comprises a wider upper leg 24, a shorter lower leg 25 and a base crosspiece 26 which connects the upper leg 24 to the lower leg 25. The outer side of the base crosspiece 26 of the guide rail 23 adjoins the bearing ribs 21, 22 of the extruded section 12, and the guide rail 23 is locked on the extruded section 12 by a screw connection. This screw connection comprises a groove 27 which is essentially parallel to length of the guide rail 23 and which is formed on the extruded section 12 in the connecting area of the bearing crosspiece 17 to the connecting crosspiece 18. Groove 27 is in the from of a lengthwise slot which is open to the inside in a grooved crosspiece 28 which represents an integral component of the extruded section 12. The guide rail 23 has a flange crosspiece 29 which represents a downwardly projecting prolongation ofthe base crosspiece 26, and is penetrated parallel to the groove 27 by holes or slots spaced in the lengthwise direction or a continuous lengthwise slot.

The flange crosspiece 29 adjoins the inner edge of the grooved crosspiece 18 and is penetrated in the area of its slot or slots by screws 30 which are made as self-tapping screws and fit with their threaded part into the groove 27, and thus, press the base crosspiece 26 of the guide rail 23 against the bearing ribs 21, 22 of the extruded section 12. In the guide rails which are provided in the respective side members, on each side of the vehicle roof opening, the folding roof of the vehicle convertible roof section is guided to be able to slide in a manner which is not shown but is shown and described in the above-noted commonly owned, U.S. patent application Nos. 09/593,437 and 09/594,342.

The guide rail 23 is also used, in a manner which is not explained here, to hold a side member inner screen 31 which extends to the outside as far as the shell-type crosspiece 15.

Measures are taken for sealing the bottom edge and the top edge of the outer skin panel section 13 relative to the side member-guide rail structure 10. These sealing measures include a sealing lip 32 which is made on the top end of the door and/or window pane seal 14 and which, on the one hand, adjoins the inside of the outer skin panel section 13, and on the other hand, the sealing rib 33 which projects inward from the outer skin panel section 13 in the area of its lower edge.

A similar sealing rib 34 is formed in the area of the upper edge of the outer skin panel section 13, likewise projecting inward. This sealing rib 34 and the inside of the outer skin panel section 13 engage a sealing lip 35 of a folding roof seal 36 which runs along the guide rail 23 and is fixed in a retaining channel 37 which is U-shaped in cross section, which projects from the top of the upper leg 24 of the guide rail 23 and which is formed integrally with it.

The side member-guide rail structure 10 which is shown in the figures can also be made as a component which is detachable from the body in the manner shown and described in the above-referenced co-pending application, i.e., the structure 10 can detachably joined to the A column and the B column of the vehicle. In this case, in the area of the ends of the rail structure 10, there are sealing means (not shown) which are preferably made integrally with the sealing means which run in the lengthwise direction, i.e., the door and/or window pane seal 14 and the folding roof seal 36.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Motor vehicle convertible roof structure for movably guiding a folding roof in an area at each side thereof, comprising side members formed of an extruded section having a one-piece, closed hollow core structure with flange sections extending outwardly therefrom at bottom and inner sides thereof, a guide rail bearing on the flange sections that are located at an inner side of the extruded section, an outer skin panel section on an outer side of the extruded section and at least one of a door seal and a window pane seal on a one of said flange sections that is located on the bottom side of the extruded section.

2. Convertible roof structure as claimed in claim 1, wherein the extruded section has a support crosspiece which at least approximately longitudinally follows the outer skin panel section and to which the outer skin panel section is elastically spot joined.

3. Convertible roof structure as claimed in claim 2, wherein the outer skin panel section is spot cemented to the support crosspiece.

4. Convertible roof structure as claimed in claim 2, wherein the outer skin panel section is spot joined onto the support crosspiece.

5. Convertible roof structure as claimed in claim 1, wherein said at least one of the door seal and window pane seal is mounted to at least one of said flange sections.

6. Convertible roof structure as claimed claim 1, wherein the guide rail is formed separately from the extruded section and is attached to it with screws.

7. Convertible roof structure as claimed in claim 1, wherein at least two of the flange sections of the extruded section form at least two bearing ribs for the guide rail on the inner side of the extruded section, said bearing ribs extending in the lengthwise direction of the extruded section and being spaced from each other crosswise relative to the longitudinal direction; and wherein at least one groove extends essentially parallel to the bearing ribs for engagement of self-tapping screws which penetrate one of the guide rail and a connecting part thereof.

8. Convertible roof structure as claimed in claim 7, wherein the core structure of the extruded section has a cross section with an outer side which forms a support for the outer skin panel section, an inner side for joining to the guide rail and wherein said one of said flange sections that is located on the bottom side of the extruded section projects down and outward for said at least one of the door seal and window pane seal.

9. Convertible roof structure as claimed claim 1, wherein said at least one of the door seal and window pane seal has an additional sealing section for sealing relative to a lower edge of the outer skin panel section.

10. Convertible roof structure as claimed claim 1, wherein the guide rail has a folding roof seal on its top, said folding roof seal having an additional sealing section for sealing relative to a top edge of the outer skin panel section.

11. Convertible roof structure as claimed claim 1, wherein the extruded section is made of aluminum.

12. Convertible roof structure as claimed claim 1, wherein the extruded section is made of plastic.

* * * * *